US006624784B1

(12) United States Patent
Yamaguchi

(10) Patent No.: US 6,624,784 B1
(45) Date of Patent: Sep. 23, 2003

(54) ADAPTIVE ARRAY ANTENNA

(75) Inventor: Ryo Yamaguchi, Yokohama (JP)

(73) Assignee: NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 09/508,079

(22) PCT Filed: Jul. 9, 1999

(86) PCT No.: PCT/JP99/03730

§ 371 (c)(1),
(2), (4) Date: May 30, 2000

(87) PCT Pub. No.: WO00/03456

PCT Pub. Date: Jan. 20, 2000

(30) Foreign Application Priority Data

Jul. 13, 1998 (JP) .......................................... 10-197580
Jul. 13, 1998 (JP) .......................................... 10-197581

(51) Int. Cl.$^7$ ................................................ G01S 3/16
(52) U.S. Cl. ...................... 342/378; 342/372; 342/383
(58) Field of Search .............................. 342/368, 372, 342/378, 383

(56) References Cited

U.S. PATENT DOCUMENTS

| | | | | |
|---|---|---|---|---|
| 4,528,674 A | * | 7/1985 | Sweeney et al. ................ | 375/1 |
| 4,720,712 A | * | 1/1988 | Brookner et al. ............ | 342/383 |
| 4,771,289 A | * | 9/1988 | Masak ......................... | 342/383 |
| 4,931,977 A | * | 6/1990 | Klemes ....................... | 364/581 |
| 5,036,333 A | * | 7/1991 | Chapman et al. ............ | 342/370 |
| 5,549,111 A | * | 8/1996 | Wright et al. ................ | 128/742 |
| 5,939,569 A | * | 8/1999 | Stahle et al. ................. | 342/174 |
| 6,061,553 A | * | 5/2000 | Matsuoka et al. ........... | 455/273 |
| 6,087,986 A | * | 7/2000 | Shoki et al. ................. | 342/383 |
| 6,232,921 B1 | * | 5/2001 | Aiken et al. ................. | 342/383 |

FOREIGN PATENT DOCUMENTS

| | | |
|---|---|---|
| EP | 0 098 339 | 1/1984 |
| JP | 62-024702 | 2/1987 |
| JP | 10-503892 | 4/1998 |
| WO | WO 95/34103 | 12/1995 |

OTHER PUBLICATIONS

K. Cho, et al., IEEE Antennas and Propagation Society International Symposium 1998 Digest, vol. 2, pp. 639–642, "Adaptive Antennas Employing Vertical Pattern Control For Street Microcell", Jun. 21–26, 1998.

M. Cabrera, et al., Signal Processing IV: Theories and Applications, vol. 1, Conf. 4, pp. 271–274, "Multibeam Adaptive Array", Sep. 5–8, 1988.

M. M. Combaud, Colloque Sur Le Traitement Du Signal et Des Images, vol. 2, colloque 11, pp. 419–422, "Traitement D'Antenne Par Sous–Reseaux", Jun. 1–5, 1987 (with partial English translation).

* cited by examiner

Primary Examiner—Dao Phan
(74) Attorney, Agent, or Firm—Oblon, Spivak, McClelland, Maier & Neustadt, P.C.

(57) ABSTRACT

An adaptive array antenna having a plurality of array antennas including a plurality of antenna elements which are spaced at first intervals at which a large first correlation is exhibited, the array antennas being spaced at second intervals at which a second correlation is negligible, where a diversity of effects are produced, such as fading compensation, eliminating by interference waves coming from the same direction, and augmenting the gain by main beam tracking, providing one or more calibration signal coupling parts and multi-beam synthesizing circuit are so as to remove individual variations in calibration signals and to perform highly reliable calibration.

12 Claims, 17 Drawing Sheets

ADAPTIVE ARRAY ANTENNA

TECHNICAL FIELD

The present invention relates to an adaptive array antenna and a method for calculating a calibration amount of a receiving system of the adaptive array antenna and a method for calibration.

BACKGROUND ART

Generally, the adaptive array antenna is used for beam control of array antennas. There are two kinds of algorithms for the beam control, which are an interference suppression tracking type and a maximum gain tracking type. In the interference suppression tracking type, tracking is performed having a null point to interference waves and having strong directivity to desired waves. In the maximum gain tracking type, tracking is performed such that the receiving level of the antenna is maximized. In each of the types, a mobile station can be tracked by a main beam. At the current time, the spacing between elements of the array antenna is usually $\lambda/2$ as shown in FIG. 12. The reason for this is that a grating lobe may occur when the spacing is more than $\lambda/2$ as shown in FIG. 13. The grating lobe may increase interference since the main lobe can be distracted to an unnecessary direction. Although the width of the beam narrows, gain increase by this is not obtained.

Because the spacing between elements of the array antenna shown in FIG. 12 is narrow, the correlation between the elements is very high. Therefore, when the receiving level deteriorates due to fading, the deterioration influences all elements 1–8 which are included in the array antenna so that the deterioration can not be compensated for. Especially, the phenomenon is remarkable for a small sized array antenna which has about 4 elements. In addition, in the interference suppression tracking type algorithm, when there are interference waves coming from near the direction of desired waves, the interference suppression capability deteriorates remarkably since the interference waves exist in the main lobe.

That is, in the narrow element spacing adaptive signal processing, correlation of envelope and signal between elements is extremely strong and the phase deviation is less than a wave length. In the interference suppression tracking type algorithm, wait (phase and amplitude) of each antenna element is obtained such that the interference waves cancel each other out and the desired waves do not cancel each other out. Interference waves which come from a direction different enough from the desired waves are input into the antenna as a signal having strong envelope and signal correlation like the desired waves. However, since the arriving angle is different, the phase difference of the interference waves between elements is different from the phase difference of the desired waves. As a result, the desired waves are not necessarily in opposite phase for a wait in which the interference waves are in opposite phase. In many cases, the desired waves operate as in phase. On the other hand, when the arriving direction of the interference waves is close to the desired waves, the amount of phase shift of the desired waves and the interference waves is almost the same. Therefore, the attempt to cancel the interference waves may result in canceling the desired waves so that the interference suppression capability deteriorates.

On the other hand, since a diversity antenna is designed such that the correlation between elements becomes small, the spacing between elements 21–28 is large as shown in FIG. 14. Since the correlation is small, when the receiving level of an element declines, the receiving level of another element may be high. Generally, a maximal ratio combining (MRC) algorithm is applied. According to the maximal ratio combining algorithm, receiving waves of each of the antenna elements 21–28 are synthesized after assigning weights of envelop level of the receiving waves after placing the receiving waves in phase. According to this algorithm, the concept of beam control is not applied because the spacing between elements is large, thus, many ripples exists in the envelope which is the beam of each element. Therefore, tracking is not performed since too many main beams exists. Thus, the gain increase by narrowing the beam can not be expected. According to the algorithm, when there are the interference waves, the influence is directly exerted. Because, as mentioned above, in the synthesizing method, amplitude and phase are controlled such that signals of all elements can be received at maximum gain, and the interference waves and the desired waves are treated without distinction. Accordingly, the method of the maximum ratio synthesizing diversity shown in FIG. 14 is effective for improving receiving characteristics of a desired station that has deterioration due to fading. However, the method does not contribute to improved interference characteristics.

As mentioned above, the narrow element spacing adaptive array antenna of the interference suppression tracking type is effective in suppressing interference waves other than from main beam. However, the antenna has no effect for suppressing interference waves in the main beam and fading. On the other hand, although the diversity antenna which has the wide element spacing can compensate for deterioration of characteristics of the desired waves due to fading, the diversity antenna has no effect pertaining to interference waves.

In addition, there are two more combinations of antenna placements (narrow element spacing, wide element spacing) and algorithms (maximum ration synthesizing, interference suppression). First, the combination is the maximum gain tracking type which uses the narrow element spacing as shown in FIG. 15 and the maximum ratio synthesizing algorithm. Second, the combination is the interference suppression type which uses the wide element spacing as shown in FIG. 16. In the method shown in FIG. 16, the antenna is set for diversity configuration and the algorithm is the interference suppression type. According to the method, capability of interference wave suppression is kept as the basic characteristic of the algorithm. In addition, fading can be compensated for since the correlation between elements is small in the diversity configuration. Especially, the characteristic is remarkable when the angle of spreading of arriving waves is large. A wait (phase and amplitude) can be determined such that many coming element waves of the interference waves are statistically canceled out because phase differences due to the arriving angle are different. Therefore, even if the arriving angles are the same, a wait can be generated such that the desired waves become inphase and the interference waves become opposite phase.

However, according to the combination method of the maximum gain tracking type which uses the narrow element spacing shown in FIG. 15 and the maximum ratio synthesizing algorithm, high gain can be obtained and the desired waves can be tracked with an antenna similar to the adaptive array antenna shown in FIG. 12. However, the method has no effect on interference waves and fading. In addition, according to the combination method using the wide element spacing and the interference suppression type shown in FIG. 16, gain increase can not be obtained because the wideness of the element spacing prevents tracking by the main beam.

DISCLOSURE OF THE INVENTION

One of the objects of the present invention is to solve the above-mentioned problems. The object is to provide an adaptive array antenna which has diversity effects such as fading compensation or the like, eliminates the interference waves from the same direction and increases gain by main beam tracking.

In order to obtain effects which are diversity effects such as fading compensation or the like, removing interference waves from the same direction and increasing gain by main beam tracking, the adaptive array antenna needs to be accurately calibrated. In the following, the calibration will be described.

In the adaptive array antenna, it is necessary that amplitude ratio and phase difference in a high frequency band occurring between element antennas are maintained to baseband on which signal processing is performed. Generally, since a cable, an amplifier, a filter, a mixer, a converter and the like have different electronic characteristics, it is difficult to equate the amplitudes and phases of all the elements. (In the following, the electronic difference between elements will be called "individual variation".) In addition, it is practically impossible to equate the amplitudes and phases since there are differences due to temperature in addition to the general differences. Therefore, as shown in FIG. 17, it is conceivable to measure the amplitude ratio and the phase difference between the elements by providing the same calibration signals to each antenna and correct the amplitude ratio and the phase difference beforehand based on the measurement in order to keep the amplitude ratio and the phase difference constant within a fixed period.

The calibration signal can be realized by inserting the signal into a frame format at each channel during constant time intervals of one minute or ten minutes or the like. A calibration signal input terminal may be described as a switch type shown in FIG. 18A in the following description. In addition, the terminal may be a type that connects to an antenna cable or the like electromagnetically as shown in FIG. 18B. In the switch type, communication is interrupted during the switching. On the other hand, the type using an electromagnet connection has the effect that there is no such interruption. In the FIGS. 18A, 18B, the array antenna is connected to the terminals a and b and the calibration signal is applied to the terminal c.

The part where the calibration signal is applied is called a calibration signal coupling part, which includes the calibration signal input terminals of the switch type and the electromagnetically connecting type.

FIG. 17 shows the array antenna which includes antenna elements #1–#4. Signals received by each of the antenna elements are applied to a distribution and synthesizing part 134 via filters 103–106 and high frequency amplifiers 107–110. In the distribution and synthesizing part 134, the signal received by the antenna is distributed to channels. Therefore, the signals after the distribution and synthesizing part 134 are transmitted to a plurality of channels. However, one channel in the plurality of channels is shown in FIG. 17. The received signals distributed by the distribution and synthesizing part 134 are added at a signal adder 132 via mixers 111–114, filters 115–118, intermediate frequency amplifiers 119–122, A/D converters (analog digital converters) 123–126 and waits 128–131. An adaptive signal processing device 133 controls amplitude and phase of the waits 128–131. As a result, the received signals are transmitted to a base station signal processing circuit.

The output from a calibration signal generator 101 is split in four by a signal splitter 102 and at the same time the calibration signals are applied to filters 103–106 via cables 175–178 and calibration signal input terminals 166–169 in the antenna elements #1–#4. These signals are transmitted to the base station signal processing circuit in the same way as received signals. At the time, output signals from the A/D converters 123–126 are applied to a calibration amount calculator 127. The calibration amount calculator 127 compares the amplitude and the phase of each A/D converters 123–126 with each other and calculates calibration amount for equalizing amplitude change and phase change between the antenna elements #1–#4 and the signal adder 132 in the receiving systems. The receiving system here is a system which includes a series of circuits for receiving connected to the output of the antenna. That is, the receiving system includes the filter, the high frequency amplifier, the mixer, the filter, the intermediate frequency amplifier and the AD converter. Four receiving systems are included in FIG. 17. The calibration amount is transmitted to the adaptive signal processing device 133. The adaptive signal processing device 133 stores the calibration amount in a calibration table (which is not shown in the figure). When the adaptive signal processing device 133 performs adaptive signal processing, the adaptive signal processing device 133 controls the waits 128–131 by subtracting the calibration amount.

However, the calibration signals, provided to antennas, which are regarded to be the same, have the individual variations. In FIG. 17, the calibration signal generator 101 needs to divide the output signal into the same number of signals as there are elements of the array antenna and needs to transmit the calibration signals to the calibration signal coupling part via the cables 175–178. Since the cables 175–178 and the calibration terminals have individual variations (cable characteristics and cable lengths and the like), phase differences occur in the calibration signals. As a result, there is a problem in that a calibration error occurs.

Thus, the second object of the present invention is to realize reliable calibration by eliminating effects based on the individual variations to the calibration signal.

The present invention has the following means as means for achieving the first object.

In a first embodiment of the invention an adaptive array antenna characterized in that the adaptive array antenna comprises a plurality of array antennas including a plurality of antenna elements which are spaced at intervals at which a high correlation is exhibited; where the array antennas are spaced at intervals at which the correlation is negligible; and outputs of the antenna elements being converted into baseband and adaptive signal processing being performed on the antenna elements simultaneously.

According to the first embodiment, the spacing between array antennas is a distance in which correlation can be neglected and adaptive signal processing is performed on all outputs from the antenna elements. Therefore, the adaptive array antenna has diversity effect such as fading compensation or the like, removes interference waves from the same direction and improves gain for main beam tracking.

In a second embodiment an adaptive array antenna characterized in that the adaptive array antenna comprises a plurality of array antennas including a plurality of antenna elements which are spaced at intervals at which a high correlation is exhibited; the array antennas being spaced at intervals at which the correlation is negligible; each of the array antennas performing adaptive signal processing independently; each output of the array antennas processed by adaptive signal processing being further processed by adaptive signal processing.

According to the second embodiment, an adaptive signal processing is performed in each array antenna which has a plurality of antenna elements which are separated from each other at a distance which induces a high correlation. Therefore, gain can be further improved by main beam tracking. Additionally, adaptive signal processing is further performed on each output of the array antenna on which output adaptive signal processing has been performed independently. Therefore, fading compensation can be performed more effectively.

A third embodiment is an adaptive array antenna characterized in that the adaptive array antenna comprises a plurality of array antennas including a plurality of antenna elements which are spaced at intervals at which a large correlation is exhibited; the array antennas being spaced at intervals at which the correlation is negligible; at least an array antenna of the array antennas performing adaptive signal processing; array antennas which do not perform adaptive signal processing referring to a result of the adaptive signal processing of other array antennas and adjusting phase and level of outputs of antenna elements of the array antennas which do not perform adaptive signal processing.

Further, the present invention has the following means as means for achieving the second object.

A fourth embodiment of the invention is an adaptive array antenna characterized in that the adaptive array antenna comprises: an array antenna having a plurality of antenna elements; a multi-beam synthesizing circuit for synthesizing multiple beams; a calibration signal coupling part, provided between said multi-beam synthesizing circuit and said antenna element, for inputting a calibration signal; a calibration signal generator; a calibration amount calculator; where the calibration signal generator applies a calibration signal output to the calibration signal coupling part, the calibration amount calculator calculating a calibration amount of each of receiving systems from baseband signals of the receiving systems connected to the outputs of the multi-beam synthesizing circuit and performing calibration of the receiving systems.

According to the fourth embodiment, a calibration signal is applied to the calibration signal coupling part which is provided between the multi-beam synthesizing circuit and an antenna element. And, the calibration amount is calculated for each receiving system from a baseband signal of the receiving system which is connected to the output of the multi-beam synthesizing circuit and calibration is performed on the receiving systems. Accordingly, individual variations between the calibration signals are eliminated such that reliable calibration can be realized.

A fifth embodiment of the invention is an adaptive array antenna characterized in that said adaptive array antenna comprises: an array antenna having a plurality of antenna elements; a multi-beam synthesizing circuit for synthesizing multiple beams; a calibration signal coupling part, provided between said multi-beam synthesizing circuit and said antenna elements, for inputting a calibration signal; a calibration signal generator; a calibration amount calculator; wherein the calibration signal generator applies a calibration signal output to a plurality of the calibration signal coupling parts successively, the calibration amount calculator calculating a calibration amount for each of receiving systems from baseband signals of the receiving systems connected to the outputs of the multi-beam synthesizing circuit every time the calibration signal output is applied to the calibration signal coupling part, and calibration to the receiving systems being performed by using a mean value of calculated calibration amounts.

According to the third embodiment, the array antenna which does not perform adaptive array processing refers to the result of adaptive signal processing of other array antenna, and adjusts phase and level of outputs of antenna elements of the array antenna. Therefore, the total amount of calculation can be decreased.

An aspect of the invention is the adaptive array antenna as described in one of the first three embodiments, where the adaptive signal processing is an interference suppression tracking type or a maximum gain tracking type.

This aspect of the invention defines details of the adaptive signal processing.

Another aspect of the adaptive array antenna as described in one of the first three embodiments, so that signals to which weights are assigned by the adaptive signal processing are synthesized before detection or after detection.

According to another aspect of the invention an appropriate method can be selected between synthesizing before detection and synthesizing after detection according to a communication method.

According to the fifth embodiment, a calibration amount calculation of the receiving system is performed a plurality of times and the mean value is used as the calibration amount of the receiving system. Therefore, more reliable calibration can be realized.

Another aspect of the invention is the adaptive array antenna as described in one of the fourth or fifth embodiments, where an FFT processing circuit is provided for performing calculation of multi-beam resolution within a base station in the outside of the receiving systems of the array antenna.

According to this aspect of the invention, since the FFT processing circuit is provided for performing multi-beam resolution calculations within the base station, calibration and adaptive signal processing can be performed for each antenna element.

A sixth embodiment of the invention is a calibration amount calculation method in a receiving system of an array antenna having a plurality of antenna elements, the calibration amount calculation method characterized by: applying a calibration signal generated by a calibration signal generator to a calibration signal coupling part provided in one antenna element; sending the calibration signal to a plurality of the receiving systems by a multi-beam synthesizing circuit; and calculating a calibration amount of each of the receiving systems from baseband signals obtained by detecting calibration signals of the receiving systems.

According to the sixth embodiment, individual variation between calibration signals are eliminated and reliable calibration can be performed.

A seventh embodiment of the invention is a calibration amount calculation method in a receiving system of an array antenna having a plurality of antenna elements, the calibration amount calculation method characterized by: applying a calibration signal to calibration signal coupling parts provided in a plurality of antenna elements successively; sending the calibration signal to a plurality of the receiving systems by a multi-beam synthesizing circuit provided in an array antenna simultaneously; calculating, by a calibration amount calculator connected to a plurality of the receiving systems, calibration amounts of the receiving systems from baseband signals obtained by detecting calibration signals of the receiving systems; using a mean value of the calibration amounts as a calibration amount of the receiving system.

According to the seventh embodiment, a calibration amount calculation of the receiving system is performed a plurality of times and the mean value is used as the calibration amount of the receiving system. Therefore, more reliable calibration can be realized.

An aspect of the invention is the calibration amount calculation method of the receiving systems of the adaptive array antenna as described in the sixth or seventh embodiments, where verification of calibration amount calculation is available by providing, in the outside of the receiving systems of the array antenna, an FFT processing circuit for performing calculation of multi-beam resolution within a base station.

According to this aspect of the invention, since the FFT processing circuit is provided for performing multi-beam resolution calculations within the base station, calibration and adaptive signal processing can be performed for each antenna element. In addition, calibration amount calculation can be verified.

Another aspect of the invention is a calibration method for performing calibration of a receiving system of an array antenna by performing adaptive signal processing, the processing after subtracting said calibration amount calculated by the method described in the sixth or seventh embodiments as an adaptive signal processing amount when performing adaptive signal processing for an adaptive array antenna.

According to this aspect of the invention, a calibration can be performed within adaptive signal processing without using waits for calibration.

BRIEF DESCRIPTION OF THE DRAWINGS

Other objects, features and advantages of the present invention will be apparent by reading the following description in conjunction with the accompanying drawings.

PREFERRED EMBODIMENTS FOR CARRYING OUT THE INVENTION

In the following, embodiments of the present invention corresponding to the first object will be described with reference to figures.

First Embodiment

Figure 1:
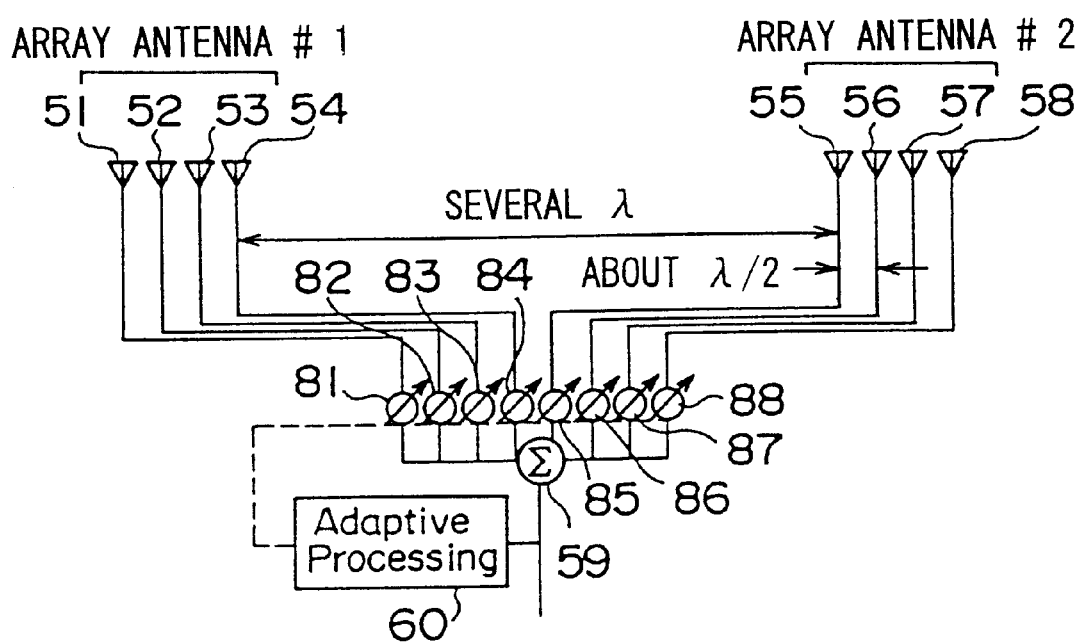
FIG. 1 is a configuration example (a first example) of an adaptive array antenna which has wide element spacing and narrow element spacing according to the present invention, and performs adaptive signal processing.

FIG. 1 shows the first embodiment which is an eight element array antenna. An array antenna #1 comprises antenna elements 51–54 and an array antenna #2 comprises antenna elements 55–58. The spacing between the array antenna elements of the array antenna #1 and the array antenna #2 is about $\lambda/2$. The array antenna #1 is placed at a distance (of several $\lambda$s) from the array antenna #2 such that the correlation becomes small enough to be negligible.

Signals from each of the antenna elements 51–58 are synthesized by the signal adder 59 via the waits 81–88 which adjust phase and amplitude of antenna output and output. The wait of the waits 81–88 is controlled by the adaptive signal processing device 60. The adaptive signal processing may be the interference suppression tracking type or the maximum gain tracking type.

In this example, all outputs from the eight elements are converted into baseband simultaneously and adaptive processing is performed. Calibration relating to the second object of the present invention is necessary in each array antenna. However, it is not necessary between the array antennas. In a multipath environment, each array antenna can augment gain and can form the main beam.

Figure 16:
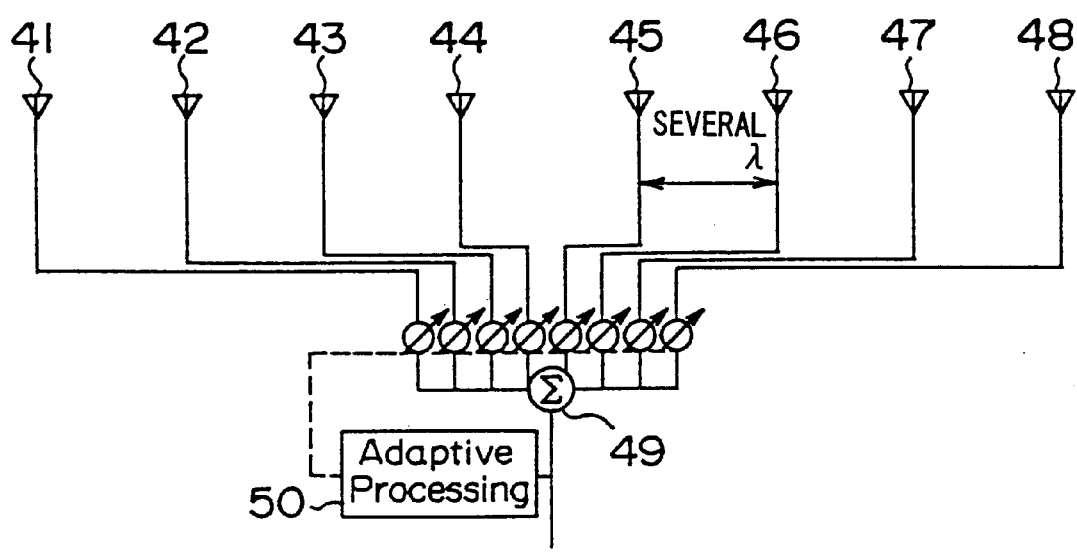
FIG. 16 is a configuration example of a conventional interference suppression type adaptive array antenna of wide element spacing.

Concerning the array antennas, in this example, consider that uncorrelated four element array antenna is added. Therefore, the same interference characteristics as shown in FIG. 16 can be obtained. That is, the array antenna has the capability of removing interference waves from the same direction. In addition, since the array antenna is uncorrelated, it has diversity effect pertaining to fading. In the algorithm of the array antenna, diversity, main beam tracking, removal of interference waves can be performed together without concerning for the difference.

Second Embodiment

Figure 2:
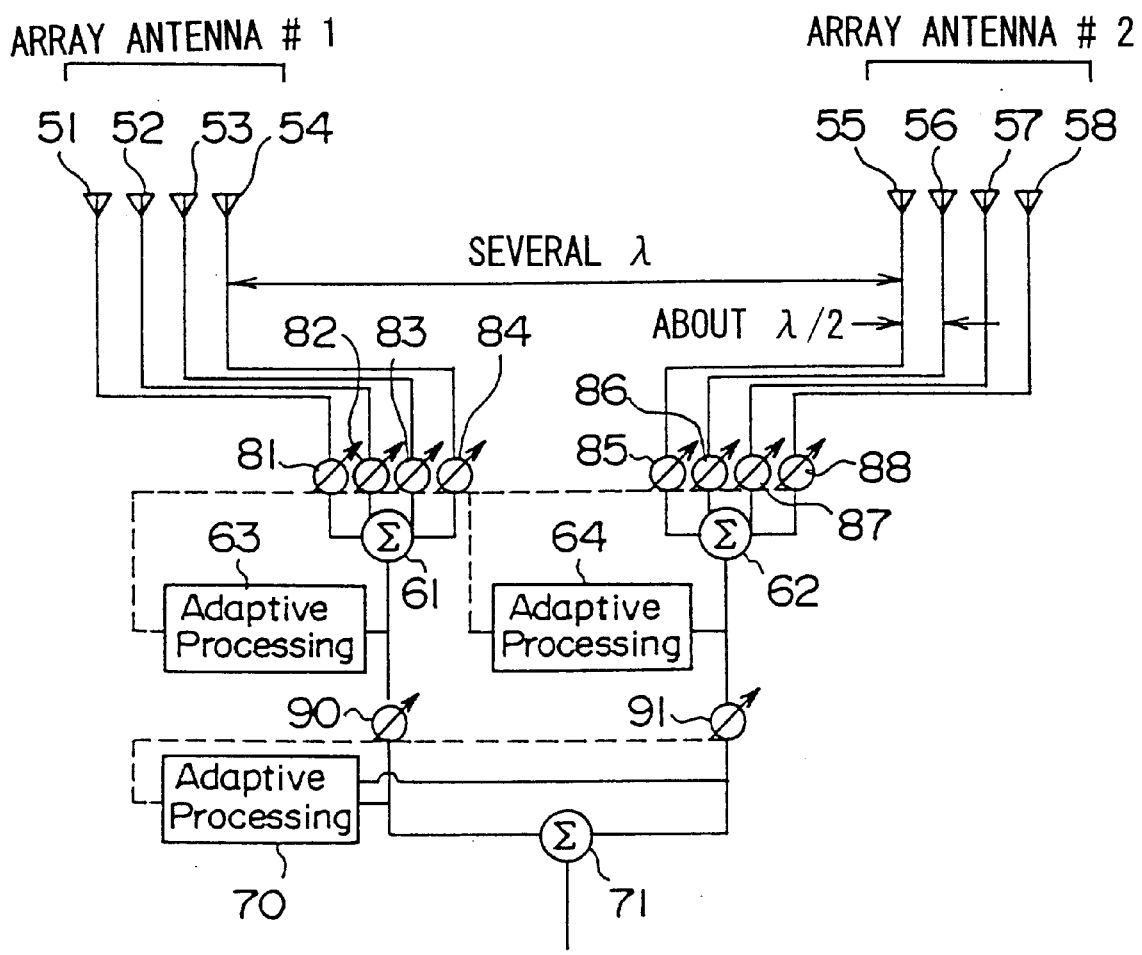
FIG. 2 is a configuration example (a second example) of an adaptive array antenna which has wide element spacing and narrow element spacing, and performs adaptive signal processing.

FIG. 2 shows the second embodiment. The number of elements is eight which is the same as the first embodiment.

The arrangement of the antenna is the same, but the signal synthesizing method is different.

Each of an array antenna #1 and an array antenna #2 operates according to an independent algorithm. That is, outputs from antenna elements 51–54 of the array antenna #1 are synthesized at a signal adder 61 via waits 81–84. The waits 81–84 are controlled by an adaptive signal processing device 63. Outputs from antenna elements 55–58 of the array antenna #2 are synthesized at a signal adder 62 via waits 85–88. The waits 85–88 are controlled by an adaptive signal processing device 64. The adaptive signal processing device 64 operates in isolation from the adaptive signal processing device 63. At this stage, since the correlation between antenna elements of each array antenna is high, fading can not be compensated for and the interference waves from the same direction can not be removed.

Baseband outputs of the signal adder 61 and the signal adder 62 are synthesized by the signal adder 71 via waits 90, 91. The waits 90, 91 are controlled by an adaptive signal processing device 70. Since the envelopes of input signals of the adaptive array antennas are uncorrelated, the baseband outputs of the signal adder 61 and the signal adder 62 are uncorrelated. Therefore, fading can be compensated for at this stage. In addition, each adaptive array antenna can remove interference waves from the same direction at this stage.

Third Embodiment

Figure 3:
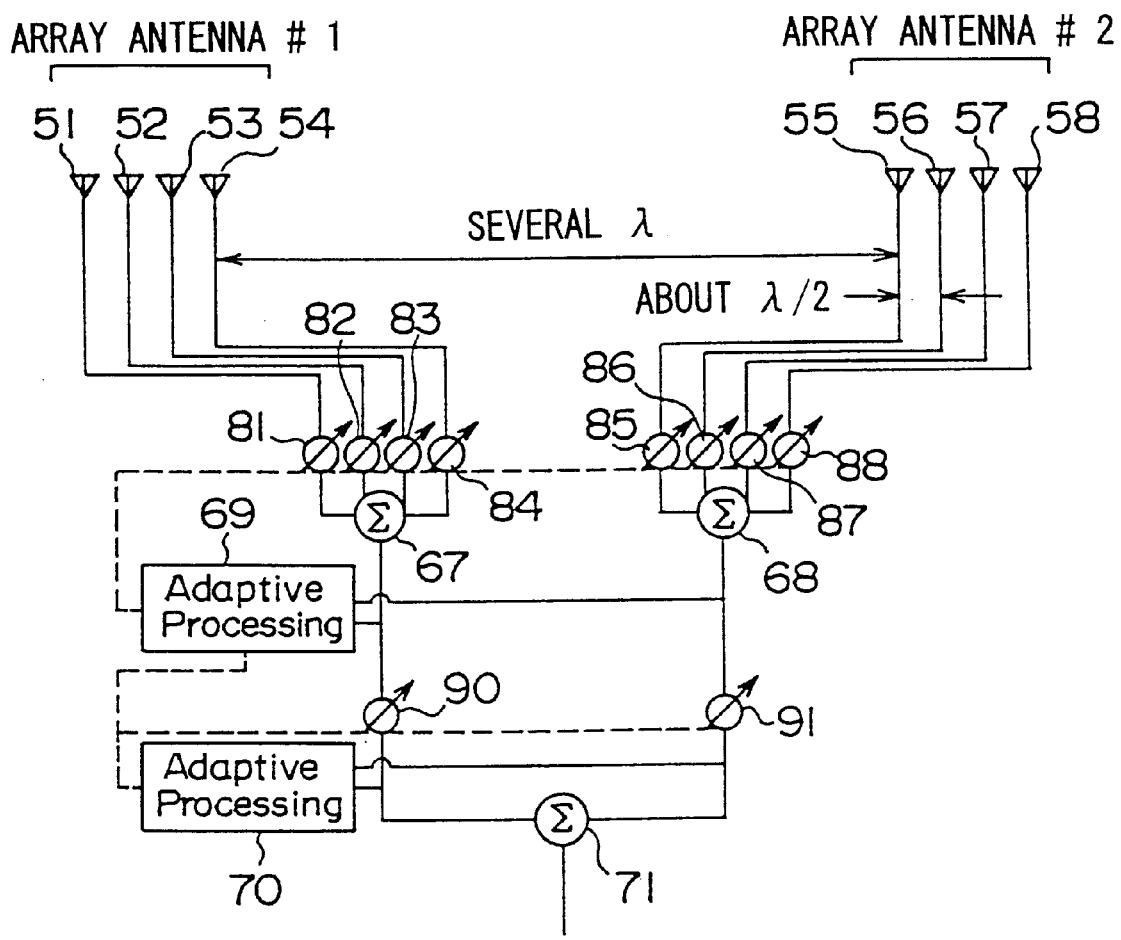
FIG. 3 is a configuration example (a third example) of an adaptive array antenna which has wide element spacing and narrow element spacing, and performs adaptive signal processing.

FIG. 3 shows the third embodiment. The configuration is the same as that of the second embodiment. However, each of the four element adaptive array antennas does not operate independently. That is, the same adaptive signal processing device 69 controls waits 81–84 of antenna elements 51–54 of an array antenna #1 and waits 85–88 of antenna elements 55–58 of an array antenna #2. A two element algorithm of the after stage selects adaptively an adaptive array antenna to be operated by determining magnitude of the power of the array antennas. By referring to waits of one side, calculation amount is decreased.

In the above-mentioned embodiment, the spacing of the antenna elements is $\lambda/2$, which is a distance for exhibiting very high correlation. However, the distance is not necessarily exactly $\lambda/2$. The distance may be around $\lambda/2$ as long as the effect of the present invention can be obtained. The spacing between the array antennas is large enough for making the correlation low enough. "The correlation low enough" does not mean no correlation. The correlation may be substantively small enough as long as the effect of the present invention can be obtained.

In addition, the present invention is not limited to the above-mentioned embodiment, that is, the configuration of eight antenna elements and two array antennas.

In the following, embodiments of the present invention corresponding to the second object will be described with reference to figures.

Fourth Embodiment

The fourth embodiment takes a configuration wherein an after-mentioned multi-beam synthesizing circuit is provided after the array antenna, signals are transmitted to an indoor part of the base station via cables, and the signals are extracted as element outputs after performing after-mentioned FFT by baseband. A calibration signal is input from a calibration signal coupling part which is located between the array antenna and the multi-beam synthesizing circuit.

The characteristics of this method are that a signal input to an element antenna is transmitted to the indoor part of the base station after being distributed to all cables via the multi bean synthesizing circuit. When a signal is input in the multi-beam synthesizing circuit, signals which have a constant phase difference are output at a plurality of output terminals. That is, it becomes possible to calibrate receiving systems for actual signals by one signal. Here, the receiving system is a series of receiving circuits connected to the output of the multi-beam synthesizing circuit. That is, the receiving system is a system including a filter, a high frequency amplifier, a mixer, a filter, an intermediate frequency amplifier and an AD converter.

Figure 4:
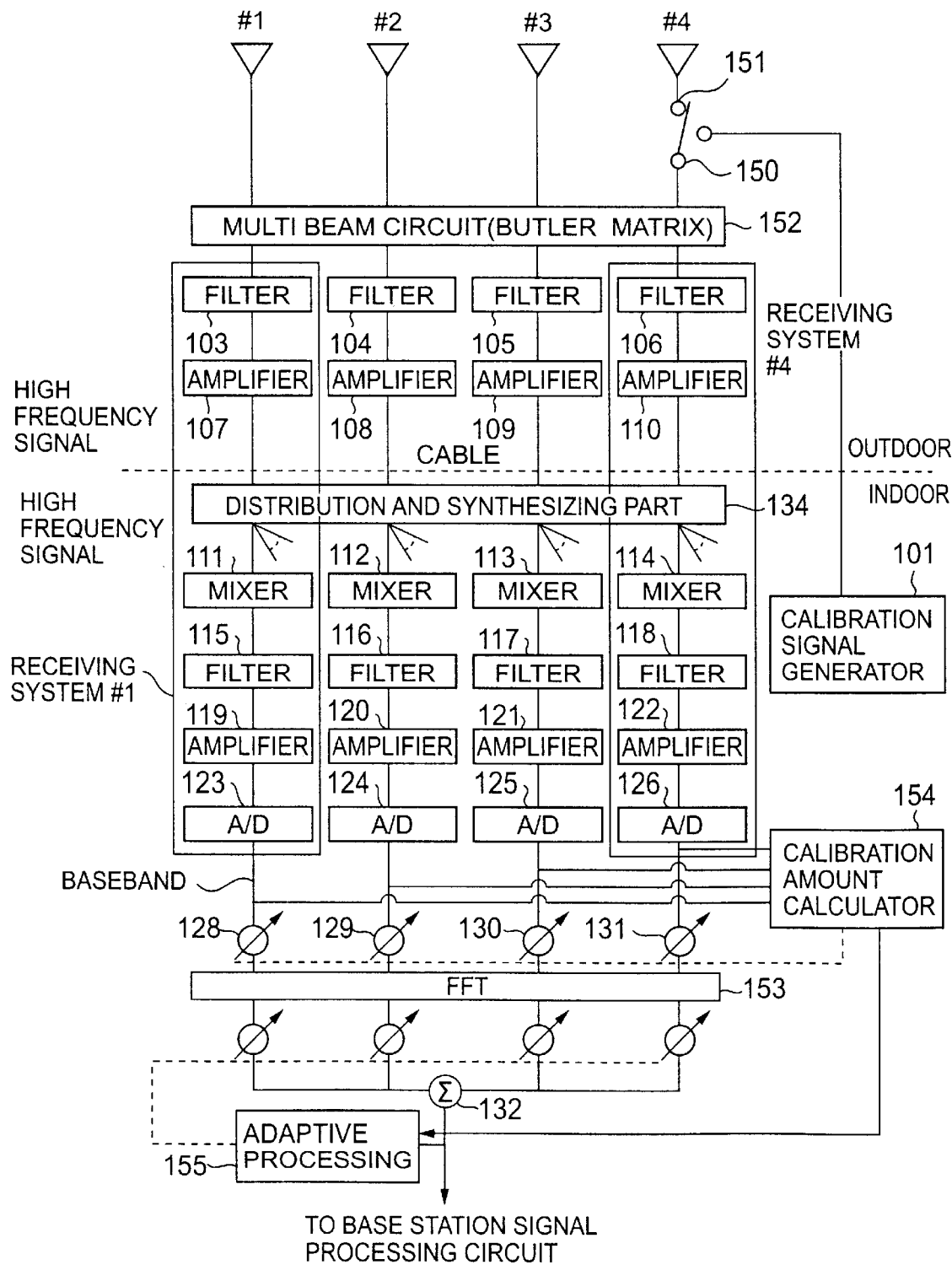
FIG. 4 is a configuration example (a first example) of an adaptive array antenna which performs calibration processing of the present invention.
Figure 19:
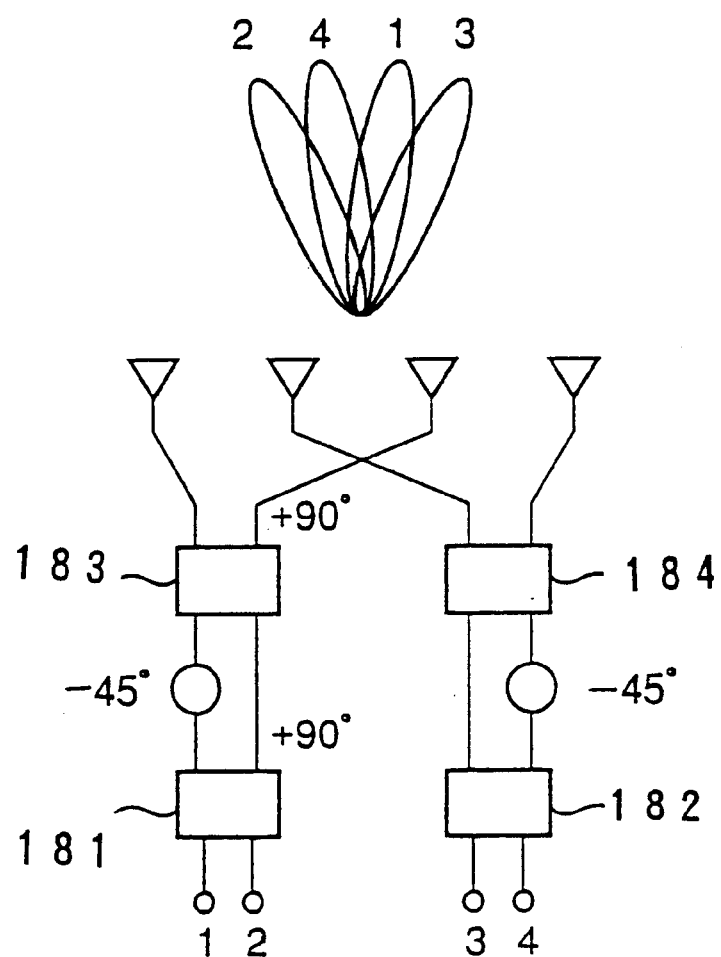
FIG. 19 is a diagram for explaining an example of a multi-beam synthesizing circuit (butler matrix).

FIG. 4 shows the fourth embodiment. The number of elements of the array antenna is four (#1–#4). A signal from a calibration signal generator 101 is applied to the multi-beam synthesizing circuit 152 via a calibration signal input terminal 150. The multi-beam synthesizing circuit 152 is a four element butler matrix as shown in FIG. 19. The butler matrix is configured by hybrids 181–184. Since it is well known, a description of the operation will not be provided. The outputs from the multi-beam synthesizing circuit 152 are applied to filters 103–106, high frequency amplifier 107–110 and a distribution and synthesizing part 134. The signals distributed here are AD-converted via mixers 111–114, filters 115–118 and intermediate frequency amplifier 119–122. In addition, FFT (Fast Fourier Transform) is performed on the signals after waits are added by waits 128–131 such that the signals are converted to normal signals of an adaptive array antenna. FFT (Fast Fourier Transform) 153 performs conversion which is reverse to that of the multi-beam synthesizing circuit. That is, the signal of the calibration signal input terminal 150 is converted by the multi-beam synthesizing circuit 152 and is output to the filters 103–106 with a constant phase. The FFT here performs reverse conversion of that. As shown FIG. 4, since the calibration signal is applied only to the receiving system #4, a signal appears only on the receiving system #4 if calibration is properly performed.

Figure 17:
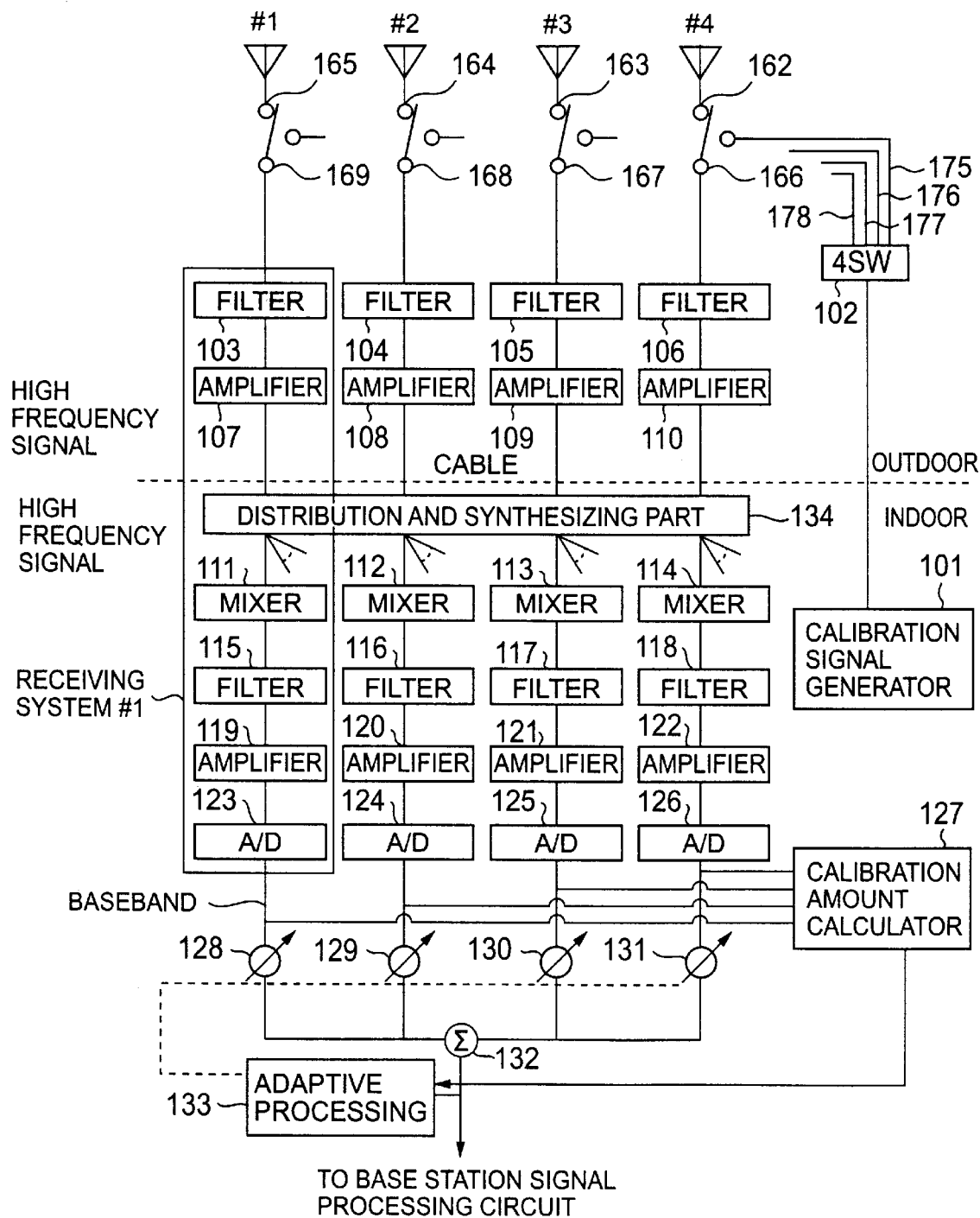
FIG. 17 is a diagram for explaining a conventional calibration method.
Figure 18A:
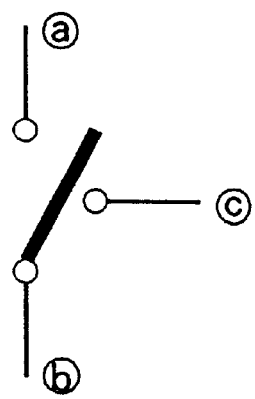
FIG. 18 is a diagram for explaining a calibration signal coupling part.
Figure 18B:
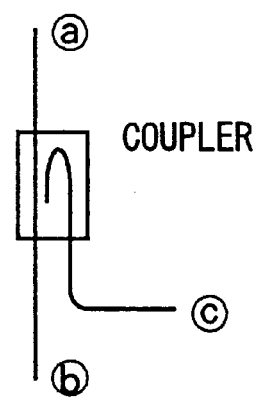

In the same way as shown in FIG. 17, a calibration amount calculator 154 calculates the calibration amount. An adaptive signal processing device 155 stores the calibration amount in a calibration table (not shown in the figure) and controls waits 128–131 by subtracting the calibration amount when performing adaptive signal processing.

The calibration may be performed by providing a wait for the calibration other than the waits for adaptive signal processing and controlling phase and amplitude of the wait for the calibration.

According to the fourth embodiment, the signal from the calibration signal generator is input to the calibration signal input terminal 150 between the antenna element #4 and the multi-beam synthesizing circuit 152, output from the four different output terminals by the multi-beam synthesizing circuit 152 with different phases and transmitted to each receiving system.

Therefore, since the individual variation between the calibration signals does not exist, highly reliable calibration can be performed by monitoring whether the phase relation is kept at a baseband part.

Fifth Embodiment

In the fourth embodiment, if the calibration signal is applied to the remaining antenna elements, signals having another phase relation appear at a plurality of terminals. In the fifth embodiment, by applying the calibration signal to a plurality of antennas in such a way, a plurality of calibration value can be obtained. Then, reliable calibration can be performed by averaging the result. Since the multi-beam outputs are synthesized just after the array antenna in the same way as the fourth embodiment, signals are transmitted to each receiving system while keeping the phase amplitude relation between antenna elements. That is, the pattern of each beam is preserved without being disturbed. Only phase ratio and phase difference between beams are disturbed. Only the value between the beams needs to be calibrated.

Figure 5:
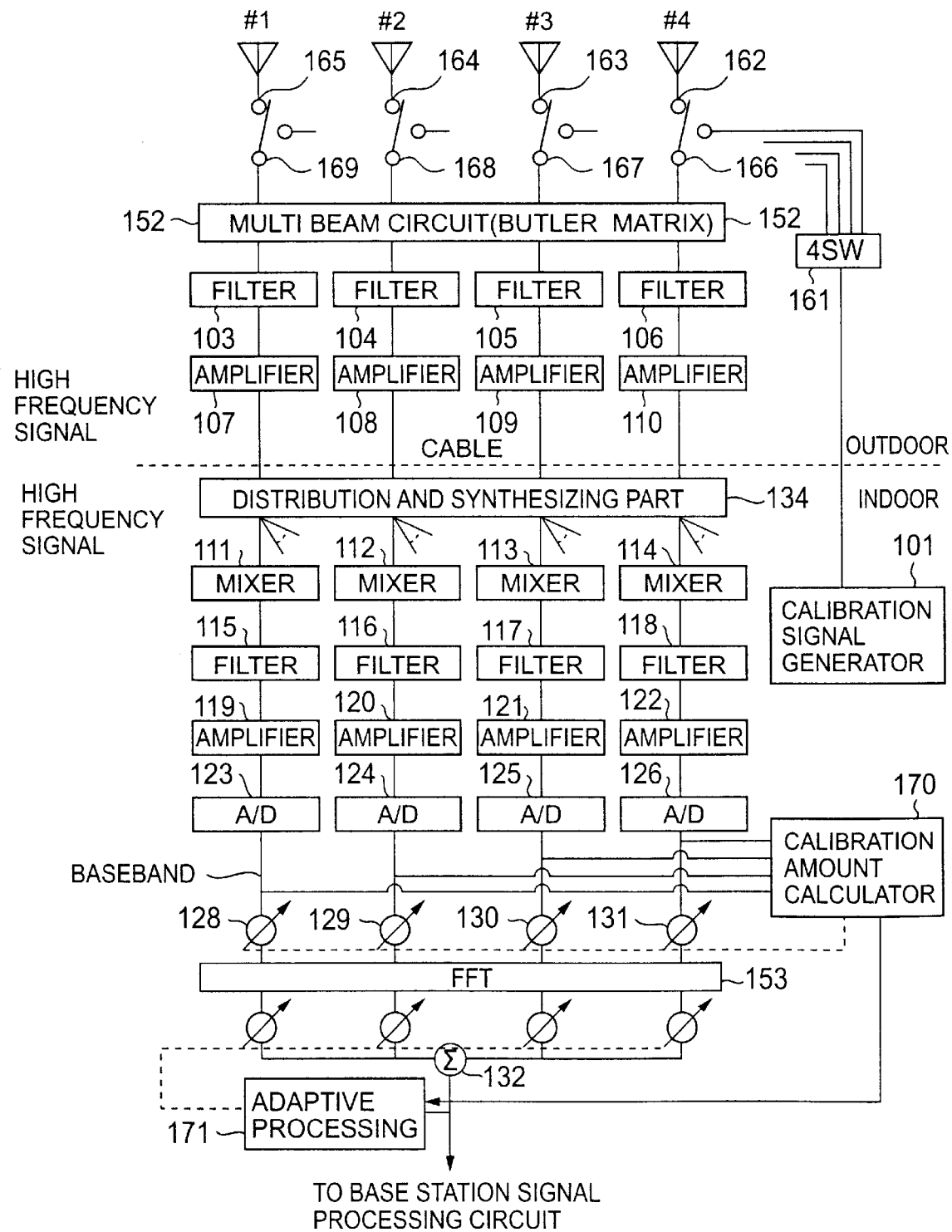
FIG. 5 is a configuration example (a second example) of an adaptive array antenna which performs calibration processing of the present invention.

FIG. 5 shows the fifth embodiment. FIG. 5 shows a configuration which is almost the same as that of the fourth embodiment. The difference is that calibration signals are input via four routes in the fifth embodiment. That is, antenna elements have calibration signal input terminals 166–169. The output from the calibration signal generator 101 is applied successively to the terminals 166–169 by using a switching circuit 161. That is, the output from the calibration signal generator 101 is applied to the calibration signal input terminals 166–169 successively. At this time, function of the calibration signal applied to each calibration signal coupling part is the same as that of the calibration signal in FIG. 4. A calibration amount calculator 170 calculates the calibration amounts based on the calibration signal applied successively and calculates a mean value of the calibration amounts after a cycle. The mean value is used as the calibration amount for use.

In the fifth embodiment, each of the calibration signals of the four routes is applied to a calibration signal input terminal of four calibration signal input terminals with different phase relation. By calibrating by switching the four routes, reliability is improved since the average of the calibration amounts is available. In this case, since the calibration signals of the four routes are not used simultaneously, calibration accuracy is not affected even when the calibration cables have individual variations.

Sixth Embodiment

In the case wherein the multi-beam output is used as it is, the FFT circuit of the after stage is not necessary and the configuration becomes simpler.

Figure 6:
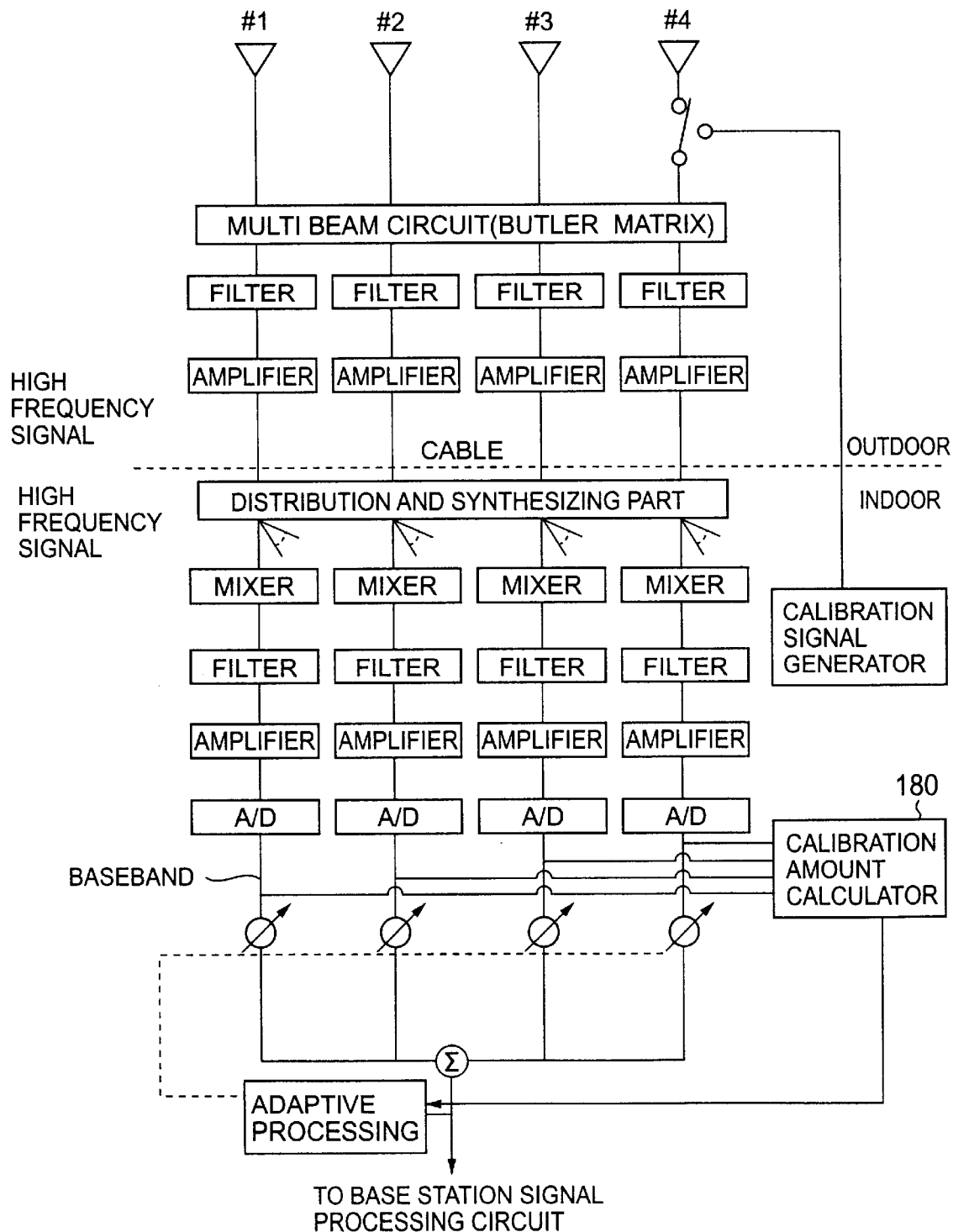
FIG. 6 is a configuration example (a third example) of an adaptive array antenna which performs calibration processing of the present invention.

FIG. 6 shows the sixth embodiment. The embodiment is an example of a configuration of an adaptive array antenna of a beam space type using a multi-beam synthesizing circuit. As compared with the fourth embodiment, the sixth embodiment does not have the FFT circuit.

Seventh Embodiment

Figure 7:
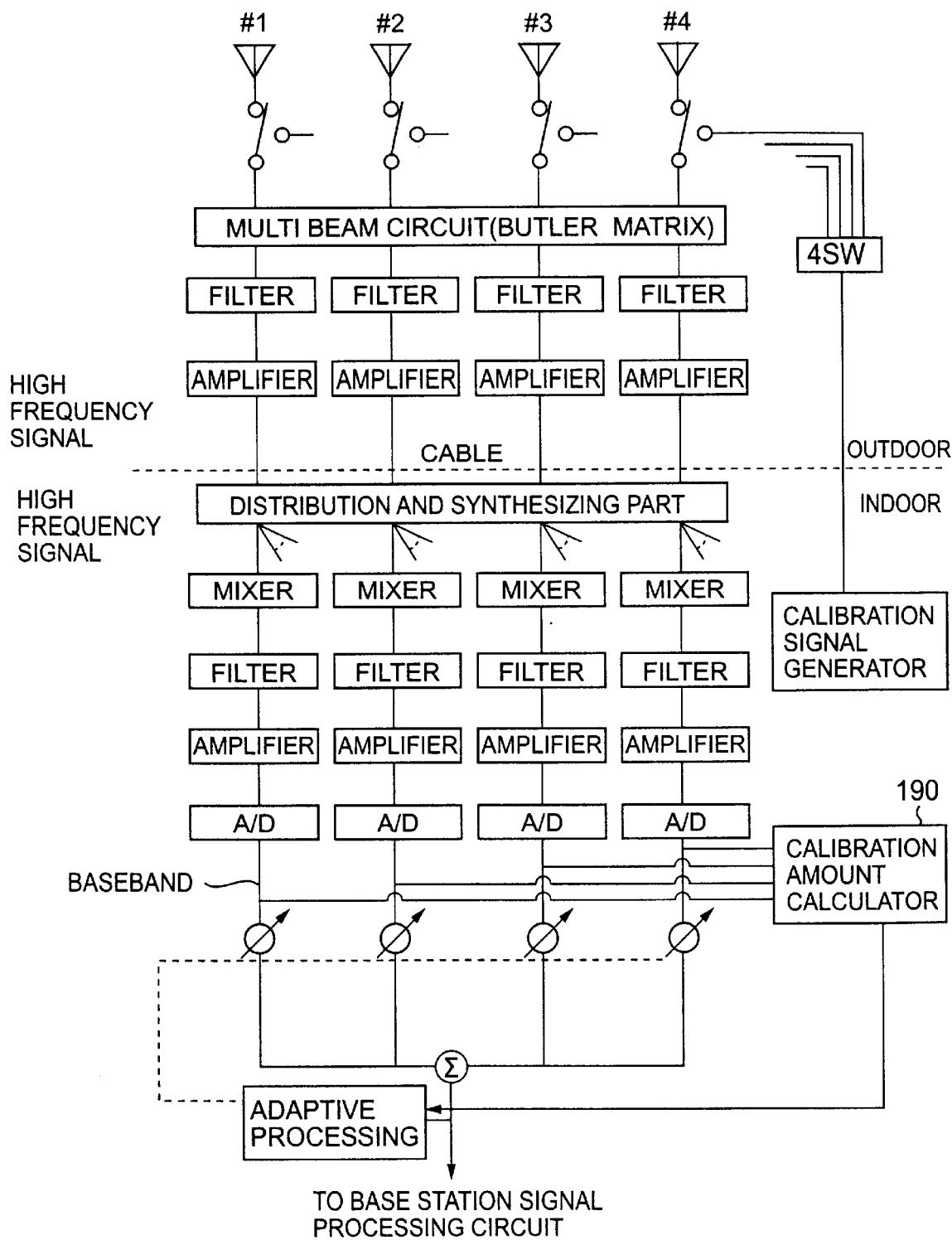
FIG. 7 is a configuration example (a fourth example) of an adaptive array antenna which performs calibration processing of the present invention.

FIG. 7 shows the seventh embodiment. Similar to the sixth embodiment, the seventh embodiment is an other example of a configuration of an adaptive array antenna of a beam space type using a multi-beam synthesizing circuit. As compared with the fifth embodiment, the seventh embodiment does not have the FFT circuit.

In the following, flowcharts of representative calibration amount calculation methods will be described.

Figure 9:
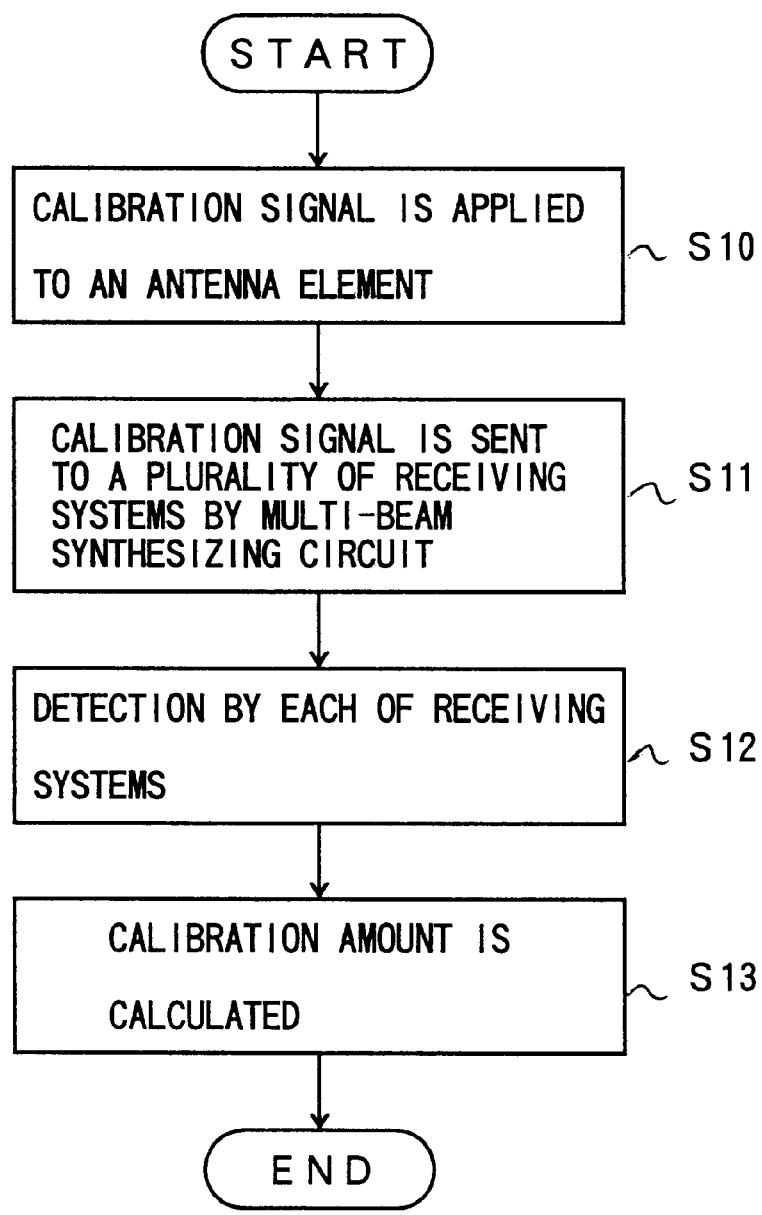
FIG. 9 is a flowchart for explaining a method (a first method) of calibration amount calculation.

FIG. 9 is a flowchart of the calibration amount calculation method in the case wherein the calibration signal is applied to one antenna element.

The calibration signal generated by the calibration signal generator is applied to the calibration signal coupling part which is provided in the antenna element (S10). The calibration signal is sent to a plurality of receiving systems simultaneously by the multi-beam synthesizing circuit (S11). Then, the calibration signal is detected in each of the plurality of receiving systems (S12). Finally, the calibration amounts of the receiving systems are calculated (S13).

Figure 10:
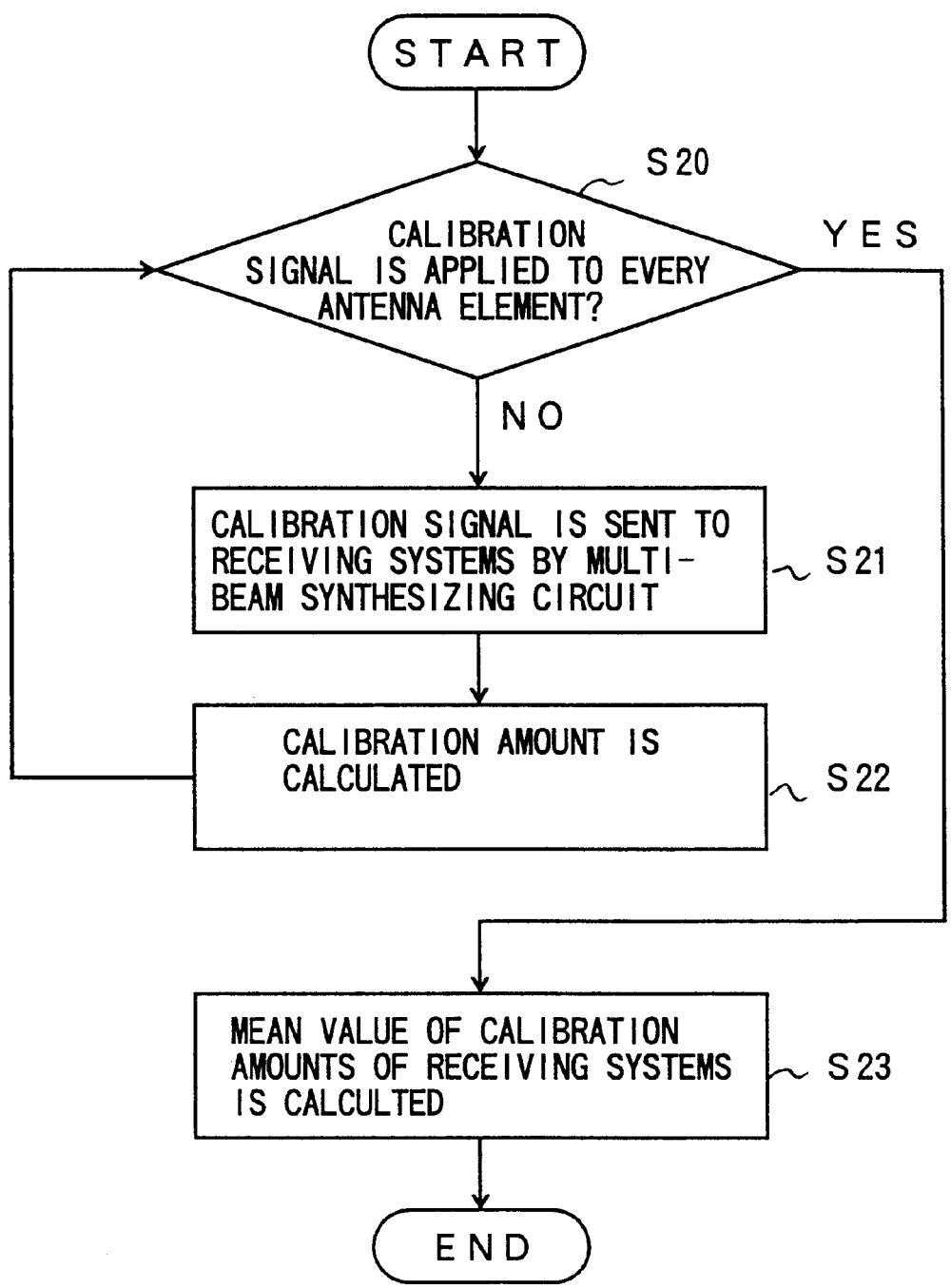
FIG. 10 is a flowchart for explaining a method (a second method) of calibration amount calculation.

FIG. 10 is a flowchart of the calibration amount calculation method in the case wherein the calibration signal is applied to a plurality of antenna elements.

The calibration signal is applied to the calibration signal coupling parts provided in a plurality of antenna elements successively and it is determined whether the calibration signal is applied to every antenna element (S20). If NO, the calibration signal is sent to a plurality of receiving systems simultaneously by the multi-beam synthesizing circuit (S21). Then, the calibration signal is detected in each of the plurality of receiving systems and the calibration amounts of each receiving system are calculated (S22). The process is repeated until the calibration signal is applied to every antenna element. When the calibration signal is applied to every antenna element (YES in S20), the mean value of the calibration amounts is regarded as the calibration amount (S23).

Figure 11:
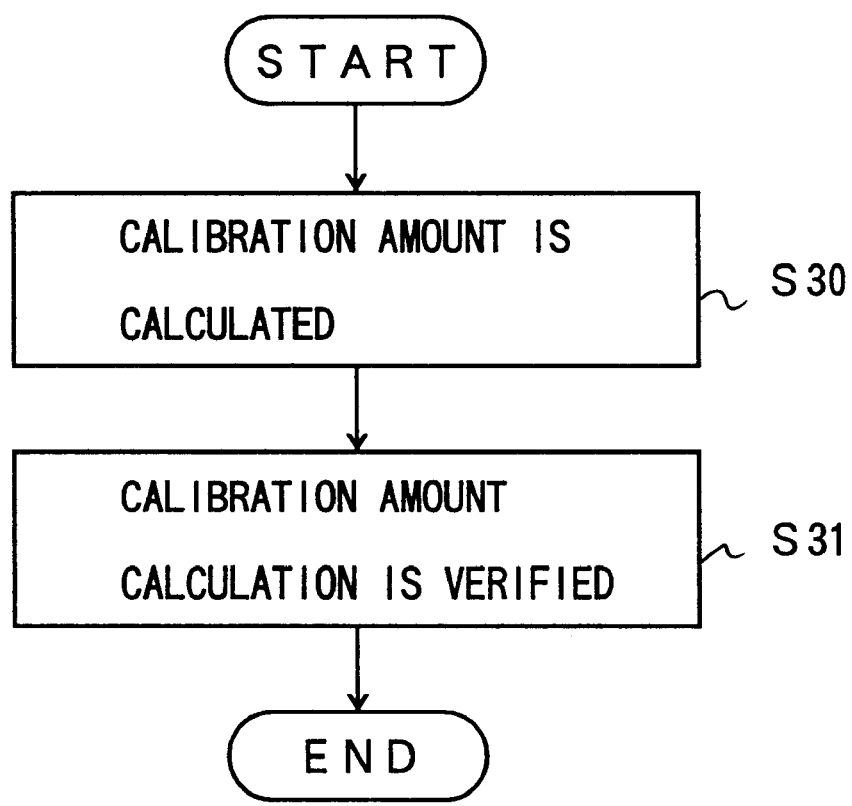
FIG. 11 is a flowchart for explaining a method (a third method) of calibration amount calculation.
Figure 12:
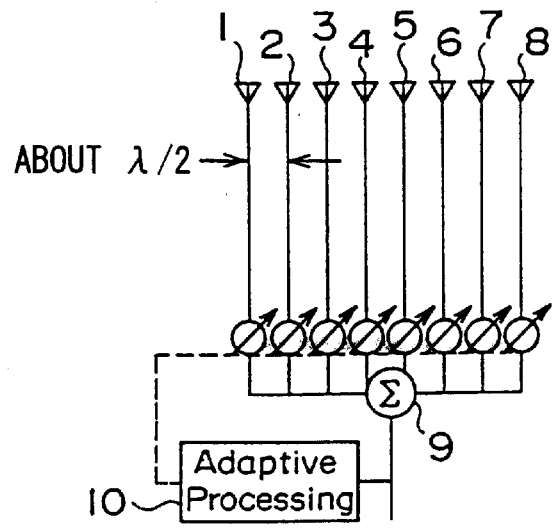
FIG. 12 is a configuration example of a conventional adaptive array antenna (a first example) of narrow element spacing.
Figure 13:
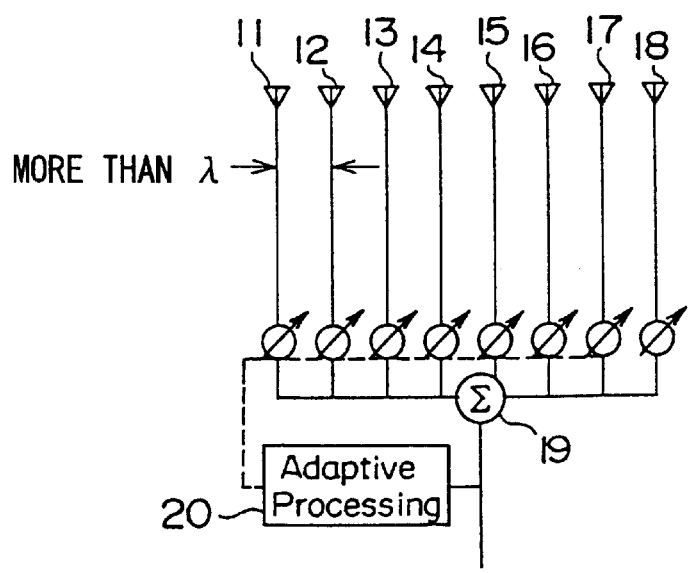
FIG. 13 is a configuration example of a conventional adaptive array antenna of wide element spacing.
Figure 14:
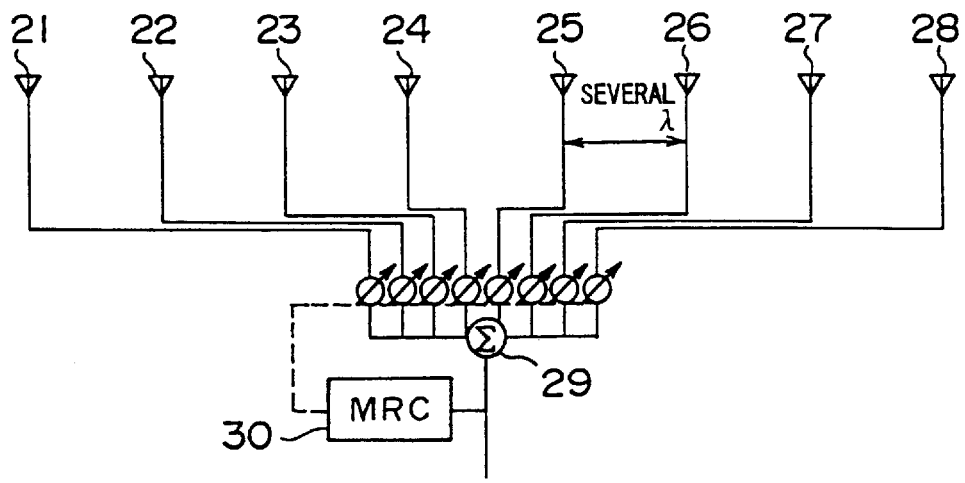
FIG. 14 is a configuration example of a conventional maximum ratio synthesizing type adaptive array antenna of wide element spacing.
Figure 15:
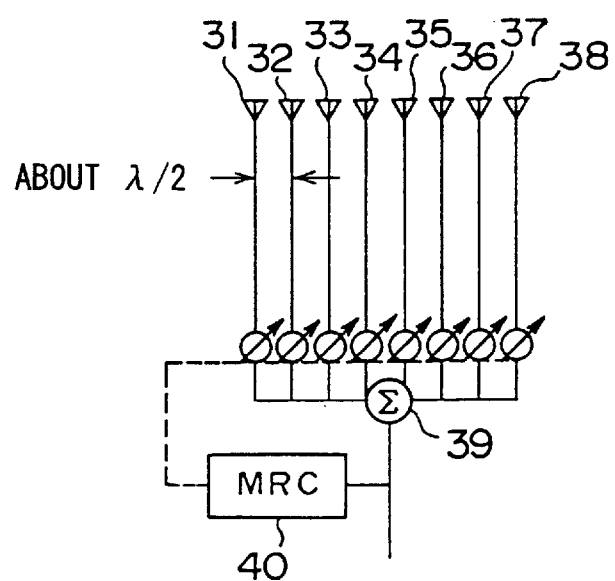
FIG. 15 is a configuration example of a conventional adaptive array antenna (a second example) of narrow element spacing.

FIG. 11 is a flowchart of the calibration amount calculation method in the case wherein the FFT processing circuit is provided outside of the receiving system of the array antenna for performing multi-beam resolution calculation in the base station.

For example, as shown in FIG. 9, the calibration amount is calculated for each antenna element (S30). At the time, a signal of a receiving system of the array antenna which is not calibrated is checked such that the calibration amount calculation is verified (S31).

As mentioned above, according to the embodiments of the present invention, it becomes possible to achieve gain of the array antenna, track beam, have diversity effects and suppress the interference waves from the same direction.

In addition, the amount of signal processing can be decreased. As a result, the application field of the array antenna can be extended.

Further, according to the above-mentioned embodiments, it is possible to calibrate a plurality of systems of a current transmission system by using only one calibration signal route. By using calibration signals of a plurality of routes, more reliable calibration result can be obtained since the calibration data can be averaged. When multi-beam output is used as it is herein, the FFT circuit in the after stage is not necessary and the configuration becomes simpler.

Figure 8:
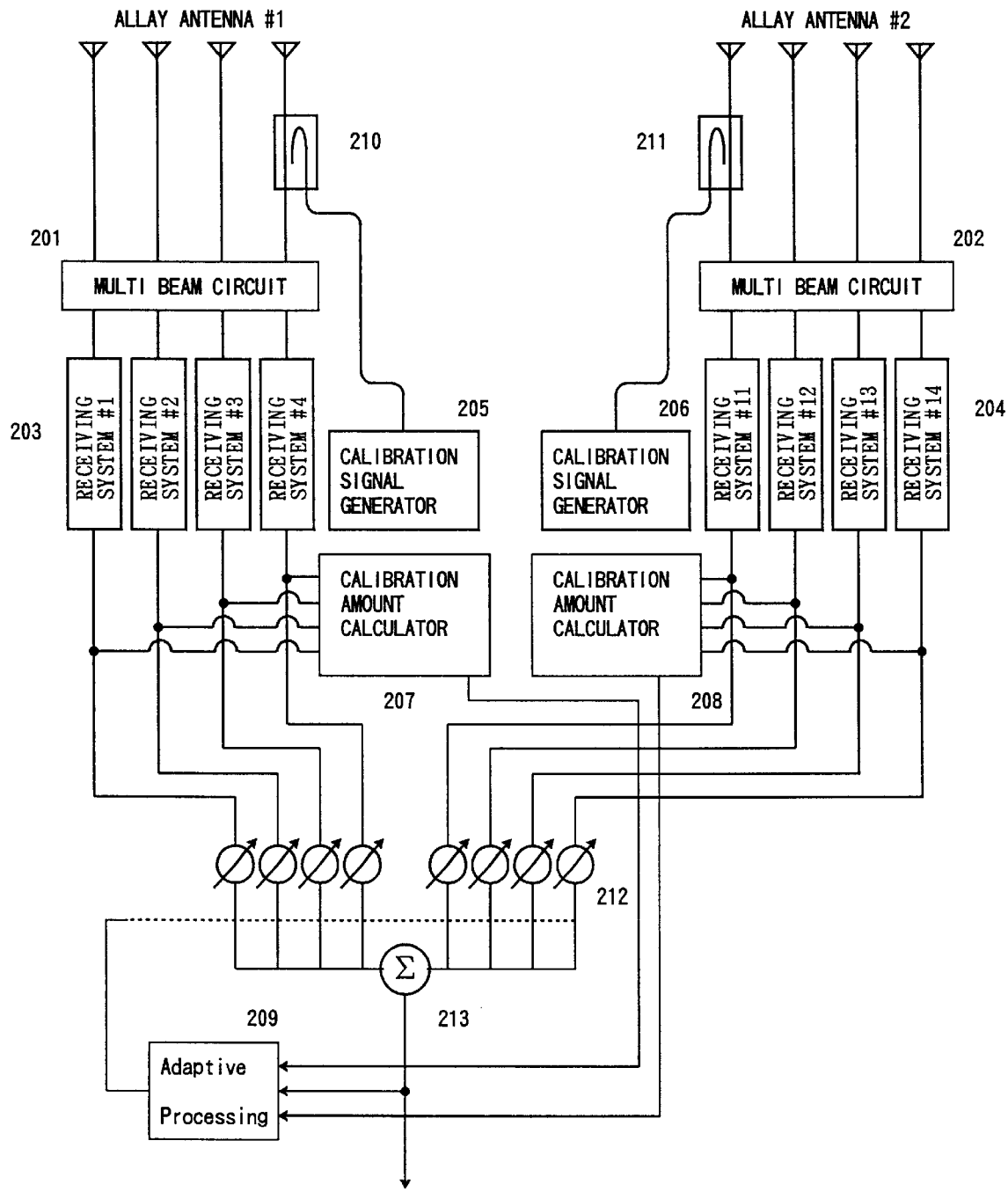
FIG. 8 is a configuration example of an adaptive array antenna which achieves a first object and a second object of the present invention.

Next, a configuration of an array antenna which can achieve both of the first object and the second object of the present invention is shown in FIG. 8.

The configuration includes array antennas #1, #2, multi-beam circuits 201, 202, #1–#4 of receiving systems 203, #1–#4 of receiving systems 204, calibration signal generators 205, 206, calibration amount calculator 207, 208, an adaptive signal processing device 209, calibration signal coupling parts 210, 211, waits 212 and a signal adder 213. The configuration is not limited to that shown in FIG. 8. Combinations from FIG. 1–FIG. 3 and FIG. 4–FIG. 7 can be used.

The array antennas #1, #2 are array antennas each of which array antenna has a plurality of antenna elements spaced at intervals at which the correlation is high. The spacing between the array antennas #1, #2 has a distance such that correlation can be negligible.

The operation can be considered as the combination of the operations of FIG. 1–FIG. 3 and FIG. 4–FIG. 7. Therefore, the description of the operation will not be given.

The adaptive signal processing device 209 may perform adaptive signal processing by using an adaptive signal processing amount obtained by subtracting the calibration amount calculated by the calibration amount calculators 207, 208.

The present invention is not limited to the specifically disclosed embodiments, and variations and modifications may be made without departing from the scope of the invention.

What is claimed is:

1. An adaptive array antenna comprising:
    a plurality of array antennas, each array antenna including a plurality of antenna elements spaced at first intervals so that a first correlation is exhibited, said array antennas spaced at second intervals so that a second correlation compared to the first correlation is negligible;
    an adaptive signal processing unit, wherein outputs of said antenna elements are converted into baseband and processed by the adaptive signal processing unit simultaneously;
    a multi-beam synthesizing circuit to synthesize multiple beams;
    a plurality of calibration signal coupling parts configured so that each array antenna is connected to said multi-beam synthesizing circuit through each of a respective calibration signal coupling part of the plurality of calibration coupling parts;
    a plurality of receiving systems each connected to said multi-beam synthesizing circuit;
    a calibration signal generator; and
    a calibration amount calculator configured to communicate with the plurality of receiving systems and the adaptive signal processing unit, wherein said calibration signal generator applies a calibration signal to each of said plurality of calibration signal coupling parts, and said calibration amount calculator calculates a calibration amount for performing a calibration for each receiving system.

2. An adaptive array antenna comprising:
    a plurality of array antennas, each array antennas including a plurality of antenna elements spaced at first intervals so that a first correlation is exhibited, said array antennas spaced at second intervals so that a second correlation compared to the first correlation is negligible;
    a first adaptive signal processing unit, wherein an output of each of said plurality of array antennas is processed by the first adaptive signal processing unit independently; and
    a second adaptive signal processing unit, wherein the output of each of said plurality of array antennas processed by the first adaptive signal processing unit is being further processed by a second adaptive signal processing unit.

3. An adaptive array antenna comprising:
    a plurality of array antennas, each array antenna including a plurality of antenna elements spaced at first intervals so that a first correlation is exhibited, said array antennas spaced at second intervals so that a second correlation compared to the first correlation is negligible;
    a first adaptive signal processing unit, wherein an output of at least an array antenna of said plurality of array antennas is processed by the first adaptive signal processing unit and other array antennas adjust a phase and level of outputs of antenna elements of said other array antennas based on an output processed by the first adaptive signal processing unit from the at least an array antenna;
    a second adaptive signal processing unit, wherein each output of the at least an array antenna processed by the first adaptive signal processing unit is further processed by the second adaptive signal processing unit.

4. The adaptive array antenna as claimed in one of claims 2–3, wherein said first adaptive signal processing unit performs one of interference suppression tracking and maximum gain tracking.

5. The adaptive array antenna as claimed in one of claims 2–3, wherein signals to which weights are assigned by said first adaptive signal processing unit are synthesized either before detection or after detection.

6. An adaptive array antenna comprising:
    an array antenna having a plurality of antenna elements;
    a multi-beam synthesizing circuit for synthesizing multiple beams;
    a calibration signal coupling part, provided between said multi-beam synthesizing circuit and one antenna element of the plurality of antenna elements, for inputting a calibration signal;
    a plurality of receiving systems each connected to said multi-beam synthesizing circuit;
    a calibration signal generator; and
    a calibration amount calculator, wherein said calibration signal generator applies a calibration signal output to said calibration signal coupling part, said calibration amount calculator calculates a calibration amount for each of the plurality of receiving systems from baseband signals of said plurality of receiving systems performs a calibration of said plurality of receiving systems.

7. An adaptive array antenna comprising:
    an array antenna having a plurality of antenna elements;
    a multi-beam synthesizing circuit for synthesizing multiple beams;
    a plurality of calibration signal coupling parts, provided between said multi-beam synthesizing circuit and each of a respective antenna element of the plurality of antenna elements, for inputting a calibration signal;
    a plurality of receiving systems each connected to said multi-beam synthesizing circuit;
    a calibration signal generator; and
    a calibration amount calculator, wherein said calibration signal generator applies a calibration signal output to the plurality of calibration signal coupling parts successively, said calibration amount calculator calculates a calibration amount for each of the plurality of receiving systems from baseband signals of said plurality of receiving systems every time said calibration signal output is applied to said calibration signal coupling part, and the calibration amount calculator performs a calibration of said plurality of receiving systems by using a mean value of calculated calibration amounts.

8. The adaptive array antenna as claimed in one of claims 6 or 7, further comprising a fast-fourier transform processing circuit configured to perform calculation of multi-beam resolution within a base station outside of said plurality of receiving systems.

9. A calibration amount calculation method in a receiving system of an array antenna having a plurality of antenna elements, comprising:
    applying a calibration signal generated by a calibration signal generator to a calibration signal coupling part provided in one antenna element;

sending said calibration signal to a plurality of receiving systems by a multi-beam synthesizing circuit; and calculating a calibration amount of each of said plurality of receiving systems from baseband signals obtained by detecting calibration signals of said plurality of receiving systems.

10. A calibration amount calculation method in a receiving system of an array antenna having a plurality of antenna elements, comprising:

applying a calibration signal successively to a plurality of calibration signal coupling parts provided in the plurality of antenna elements;

sending said calibration signal simultaneously to a plurality of receiving systems by a multi-beam synthesizing circuit provided in the array antenna;

calculating, based on a calibration amount calculator connected to the plurality of receiving systems, calibration amounts of said plurality of receiving systems from baseband signals obtained by detecting calibration signals of said plurality of receiving systems; and using a mean value of said calibration amounts as a calibration amount of said receiving system.

11. The calibration amount calculation method as claimed in claim 9 or 10, further comprising verifying the calibration amount calculation by providing, outside of said plurality of receiving systems of said array antenna, a fast-fourier transform processing circuit configured to calculate multi-beam resolution within a base station.

12. A calibration method for performing calibration of a receiving system of an array antenna by performing adaptive signal processing, comprising:

calculating a calibration amount in a plurality of receiving systems of the array antenna having a plurality of antenna elements;

applying a calibration signal generated by a calibration signal generator to a calibration signal coupling part provided in one antenna element;

sending said calibration signal to the plurality of receiving systems by a multi-beam synthesizing circuit;

calculating a calibration amount of each of the plurality of receiving systems from baseband signals obtained by detecting calibration signals of the plurality of receiving systems; and performing adaptive signal processing after subtracting said calibration amount when performing adaptive signal processing for the adaptive array antenna.

* * * * *

UNITED STATES PATENT AND TRADEMARK OFFICE
CERTIFICATE OF CORRECTION

PATENT NO.    : 6,624,784 B1
DATED         : September 23, 2003
INVENTOR(S)   : Yamaguchi It is certified that error appears in the above-identified patent and that said Letters Patent is hereby corrected as shown below:

<u>Title page,</u>
Item [86], Filing Date should read:
-- [86] PCT No.:  PCT/JP99/03730

§ 371 (c)(1),
(2), (4) Date:   March 31, 2000 --

Signed and Sealed this

Thirtieth Day of December, 2003

JAMES E. ROGAN
*Director of the United States Patent and Trademark Office*